United States Patent [19]

Lenti et al.

[11] Patent Number: 5,011,713

[45] Date of Patent: Apr. 30, 1991

[54] USE OF PERFLUOROPOLYETHER DERIVATIVES IN THE FORM OF AN AQUEOUS EMULSION FOR PROTECTING STONY MATERIALS FROM ATMOSPHERIC AGENTS

[75] Inventors: Daria Lenti; Mario Visca, both of Alessandria, Italy

[73] Assignee: Ausimont S.R.L., Milan, Italy

[21] Appl. No.: 334,521

[22] Filed: Apr. 7, 1989

[30] Foreign Application Priority Data

Apr. 8, 1988 [IT] Italy .................................. 20127 A/88

[51] Int. Cl.$^5$ ............................................. B05D 3/02
[52] U.S. Cl. ................................. 427/393.6; 428/422; 428/540
[58] Field of Search ..................... 427/393.6; 428/422, 428/540

[56] References Cited

U.S. PATENT DOCUMENTS 4,499,146  2/1985  Piacenti et al. ..................... 428/422
4,745,009  5/1988  Piacenti et al. ................... 427/393.6
4,746,550  5/1988  Strepparola et al. ........ 427/393.6 X

*Primary Examiner*—Michael Lusignan
*Attorney, Agent, or Firm*—Morgan & Finnegan

[57] ABSTRACT

Protecting marble, stone, tiles, cement, and analogous materials utilized in the building industry, from the action of atmospheric agents and pollutants, by applying onto the surface thereof a microemulsion of perfluoropolyethers, optionally provided at one end or at both ends or in the chain with functional groups capable of acting as anchoring agents to the substrate.

12 Claims, No Drawings

USE OF PERFLUOROPOLYETHER DERIVATIVES IN THE FORM OF AN AQUEOUS EMULSION FOR PROTECTING STONY MATERIALS FROM ATMOSPHERIC AGENTS

DESCRIPTION OF THE INVENTION

It is known that perfluoropolyethers impart remarkable water-repellent and oil-repellent properties to the surfaces of materials onto which they are applied.

Furthermore, perfluoropolyethers exhibit a high Bunsen coefficient for the air-gas components, wherefore they permit a good passage of the air through the surfaces of the treated materials.

By virtue of these properties perfluoropolyethers are interesting as liquids useful to protect from atmospheric agents building structures and, in general, articles made of stone, marble, cement, tiles, gypsum, or wood.

Furthermore, the lower refractive index of perfluoropolyethers, which corresponds to a value of about 1.3 measured at 20° C. with light of a sodium-vapor lamp, causes the treated article to retain its original appearance, avoiding optical interference phenomena which lead to a color alteration.

This use of perfluoropolyethers was described in an earlier Italian patent application No. 19,933 A/81. The perfluoropolyethers disclosed in this Italian patent application were of the type having chemically inert end groups consisting of perfluoroalkyl groups.

It was observed that the presence of porosity in the material to be protected led to a phenomenon of slow absorption of the perfluoropolyether types used so far, said phenomenon causing a more or less slow mi9ration (depending on the type of porosity of the treated material) of the protective liquid toward the innermost layers of the article. This results in a reduced effectiveness, in the course of time, of the protection of the outermost areas of the treated article. While on particular materials, for example sandstones, this inward diffusion is sufficiently slow as to retain a protection stability for a long time, in other cases (for example, tiles) this phenomenon causes such a decrease in the surface protective effect as to require, in the course of time, further surface treatments, although the protection of the underlying layers remains efficacious enough to remarkably slow down the alteration phenomena.

From Italian patent No. 19,628 A/85, it is known that it is possible to obtain a permanent protection of the surface area of the above-mentioned materials if perfluoropolyether derivatives with functional end groups capable of forming chemical and/or physical bonds with the substrate are used as protective agents or as coadjuvants. Such functionalized end groups become fixed to the substrate to be protected, thereby reducing the perfluoropolyether mobility and increasing the duration of the protective effect on the treated surface.

All of the systems described in Italian patent applications Nos. 19,933 A/81, 19,628 A/85 and 22,258 A/85 comprise, as an essential component, a solvent in particular a fluorocarbon or a chlorofluorocarbon.

The application of these compounds to the substrate is preferably carried out by using 1,1,2-trifluorotrichloroethane in admixture with other or9anic solvents containing from 50 to 80% by weight of the perfluoropolyether products. Application is by means of atomized liquid jet spraying, either with compressed air or without compressed air, or by means of some other appropriate method.

The amount of perfluoropolyether protective agent utilized is largely dependent on the porosity of the material to be treated, and varies from 10 g/m$^2$ to 300 g/m$^2$ as the substrate porosity increases.

From the viewpoint of ecology and environmental protection, the advantage which would result from the use of systems free from chlorofluorocarbons, and optionally in the complete absence of volatile organic solvents, is evident.

In accordance with the present invention, it has now, surprisingly, been discovered that it is possible to attain this and further advantages in the protection of works and articles made of stone, marble, cement, gypsum, and wood by using, instead of perfluoropolyethers as such or in chlorofluorocarbon solutions, aqueous microemulsions of functional perfluoropolyethers.

The term "microemulsion" is generally used to designate products macroscopically consisting of a single transparent or opalescent and optically isotropic liquid phase comprising two immiscible liquids and at least one surfactant, wherein one of the two immiscible liquids is dispersed in the other liquid in the form of droplets having diameters approximately ranging from 50 to 2,000 Å°.

In principle, the presence of particles having greater or smaller sizes up to the limit of the molecular dispersion cannot be excluded. Furthermore, compositions are possible in which the two liquids are interdispersed as bicontinuous tridimensional films, or in which the two immiscible liquids are co-solubilized at a molecular level.

Such products spontaneously form by simple mixing of the components when the interfacial tension between the two immiscible liquids decreases to values close to zero and are indefinitely stable over a certain temperature range.

In connection with the present invention, the term "microemulsion" has a broader meaning, and comprises also non-optically isotropic systems (i.e. birefringent) characterized by a liquid-crystalline type of orientation of the components.

There is an advantage in having available microemulsions instead of emulsions, as the former do not require a high dispersion energy for obtaining them; are regenerable and indefinitely stable in the long run; and while the emulsions must be prepared taking into account the order of addition of the components, they supply a high dispersion energy and have a limited stability in the course of time. Furthermore, when they give rise to a phase separation due to aging, often they cannot be restored to the original emulsion state even if the amount of high energy necessary to obtain them is employed.

The microemulsions utilized in the present invention may be of the oil-in-water type or of the water-in-oil type, and preferably of the o/w (oil-in-water) type, and consist of perfluoropolyether chain compounds having end groups at least in part of the functionalized type, and optionally peroxide bridges in the chain, and composed of mixtures of products of different molecular weights, of a perfluorinated surfactant and/or a co-surfactant such as an alkanol with 1–12 carbon atoms, and of an aqueous phase optionally comprising an electrolyte and/or an inorganic water-soluble base. The microemulsions to be used according to the present invention may be prepared by following the procedures indicated in Italian patent applications Nos. 20,910 A/86 and 19,494 A/87.

The functional groups may also be present on branches of the perfluoropolyether chain, as described in European patent application No. 244,839.

The perfluoropolyethers of the present invention may be prepared by photooxidation of $C_2F_4$ and $C_3F_6$, without any further thermal treatment, and may have peroxidic bridges in the chain.

One may also utilize perfluoropolyethers prepared by means of a process for photo-oxidation in the liquid phase with molecular $O_2$ a mixture of $C_2F_4$ and/or $C_3F_6$ and a perfluorinated conjugated diene, with subsequent decomposition of the peroxide groups contained in the photooxidation product by a thermal treatment in the possible presence of UV-rays, for example those having the formula:

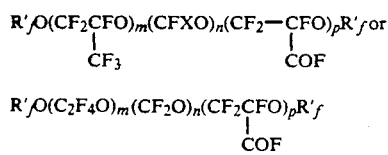

where m, n and p are integers, X = F or $CF_3$, and $R_f$ and $R'_f$ may be functional groups or perfluoroalkyl having from 1 to 3 carbon atoms.

The perfluoropolyethers utilized according to the present invention are well known in the technical and patent literature cited and are generally obtained as mixtures of compounds having the necessary perfluoropolyether structure, a molecular weight varying over a certain range, with possibly different end groups.

The mean functionality of the perfluoropolyethers ranges from 0.1 to 4, preferably from 0.1 to 2, and more preferably from 0.2 to 1.

The functional groups present in the PFPE chains may be represented by the formula:

$$CFX-(B)_J-Z_K$$

where X is F or $CF_3$, J = 0 or 1, B is a divalent or polyvalent linking hydrocarbon radical, in particular an alkylene or a cycloalkylene or an arylene radical, having up to 20 carbon atoms and preferably up to 8 carbon atoms, K ranges from 1 to 3 and preferably is 1, and Z is the actual functional group.

"Functional group Z" means a group capable of forming a chemical and/or physical bond with the aforesaid material to be protected, and selected from:
a non-aromatic, non-fluorinated organic radical containing electronic doublets-donor heteroatoms, or an aromatic radical, either containing or not containing heteroatoms, capable of giving rise to coordinate bonds or to chain transfer bonds, thereby causing different kinds of adsorption phenomena on the substrate;
—$CONR^2R^3$, —COOR where R is H or an alkyl group having from 1 to 8 carbon atoms, or an aromatic alkyl aromatic group such as benzyl;
—OH, —COF;
—NCO, —NHR, —COR; —CO—$CF_3$; and —C(OH)$_2$—$CF_3$;
$SO_3H$;
polyoxyalkylene—OH; and
quaternary ammonium.

The preferred functional groups are: —CO—$CF_3$; —C(OH)$_2$—$CF_3$; —COOH, —OH, —polyoxyalkylene—OH, and quaternary ammonium groups. The acid end group is preferably salified.

As starting products, it is also possible to use perfluoropolyethers with —COF or —$SO_2F$ end groups which, during the preparation of the microemulsion, hydrolyze to —COOH and —$SO_3H$ groups.

The mean molecular weight of the perfluoropolyether chain ranges from 500 to 10,000, and preferably from 2,000 to 6,000.

The perfluoropolyethers utilized in the present invention may also contain, besides the above-mentioned functional groups, perfluoroalkyl end groups.

The perfluoropolyethers utilized in the present invention are those consisting of fluorooxyalkylene units selected from the following groups:

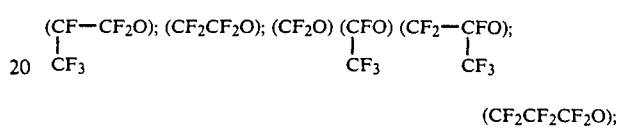

$(CF_2CF_2CF_2O)$;

and $(CF_2CF_2CH_2O)$; and in particular belonging to the following classes:

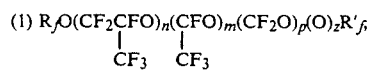

with a random distribution of the perfluorooxyalkylene units, where m, n, p and z have such mean values as to meet the abovesaid requirements concerning the mean molecular weight; z is zero or an integer, where $R_f$ and $R'_f$, either alike or different from each other, may be perfluoroalkyl end groups optionally containing 1 to 3 carbon atoms or functional end groups of the type $CFX-(B)_J-Z_K$, where B, J, Z and K are as defined hereinbefore;

(2) $R_fO(CF_2CF_2O)_n(CF_2O)_mR'_f$ with a random distribution of the perfluorooxyalkylene units, where m, n have such mean values as to meet the abovesaid requirements as to mean molecular weight; where $R_f$ and $R'_f$ may be perfluoroalkyl end groups optionally containing 1 to 3 carbon atoms or functional end groups of the type $CFX-(B)_J-Z_k$, and where B, J, Z and K are the same as defined hereinbefore;

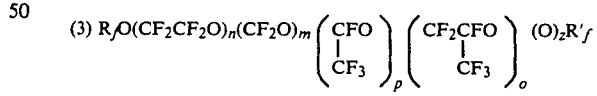

where m, n, p, o and z have such mean values as to meet the abovesaid requirements and z is as above as to mean molecular weight;

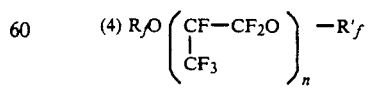

where n has such a mean value as to meet the abovesaid requirements as to mean molecular weight;

(5) $R_fO(CF_2CF_2O)_nR'_f$ where n has such a mean value as to meet the abovesaid requirements as to mean molecular weight; and (6) $R_fO(CF_2CF_2CF_2O)_nR'_f$ or $R_fO(CH_2CF_2CF_2O)_nR'_f$ where n has such a value as to meet the above requirements as to mean molecular weight.

Perfluoropolyethers of class (1) are marketed under the tradename Fomblin®Y, those of class (2) under the tradename Fomblin®Z, all of them being produced by Montedison of Italy. Commercially known products of class (4) are Krytox®(DuPont).

The products of class (5) are described in U.S. Pat. No. 4,523,039; those of class (6) are described in European Pat. No. EP 148,482 to Daikin.

The products of class (3) are prepared according to U.S. Pat. No. 3,665,041. Suitable also are the perfluoropolyethers described in U.S. Pat. No. 4,523,039 or in J. Am. Chem. Soc. 1985, 107, 1195-1201.

The products of classes (1), (2) and (3), which are obtained through photochemical oxidation processes, are utilizable as rough products of the photooxidation process, which contain in the chain peroxide groups —OO— inserted between the perfluorooxyalkylene units.

Perfluoropolyethers suitable for preparing microemulsions according to the present invention include those described in Italian patent application No. 20,346 A/86, which comprise functional groups of the above-indicated type arranged along the chain and functional or perfluoroalkyl end groups.

The microemulsions to be used in the present invention are preparable according to methods described in Italian patent applications Nos. 20,910 A/86 and 19,494 A/87. An essential ingredient is an ionic or non-ionic fluorinated surfactant. In particular, the following may be cited:

(a) perfluorocarboxylic acids having from 5 to 11 carbon atoms and the salts thereof;
(b) perfluorosulphonic acids having from 5 to 11 carbon atoms and the salts thereof;
(c) the non-ionic surfactants indicated in European patent application No. 51,526 and consisting of a perfluoroalkyl chain and of a polyoxalkylene hydrophilic head;
(d) mono- and bi-carboxylic acids derived from perfluoropolyethers and the salts thereof;
(e) non-ionic surfactants consisting of a perfluoropolyether chain linked to a polyoxyalkylene chain; and
(f) perfluorinated cationic surfactants or cationic surfactants derived from perfluoropolyethers having 1, 2 or 3 hydrophobic chains.

As a co-surfactant one may use a hydrogenated alcohol having from 1 to 12 carbon atoms, preferably from 1 to 6 carbon atoms, or a fluoroalkanol.

The following examples are given merely to illustrate the present invention, without, however, being a limitation thereon.

EXAMPLE 1

Three marble test pieces were prepared measuring 8 × 6.5 cm, characterized by different porosities. Each test piece was superficially treated with a microemulsion having the following composition:

37.8 g of a rough perfluoropolyether belonging to class (1) containing —$CF_2COF$ end groups and having a mean functionality equal to 0.46 and a viscosimetric average molecular weight of 4,600, containing peroxide bridges (peroxide power (P.O.) = 1.02), and consisting of a mixture of polymers having different molecular weights, 6.5 ml of a solution at 10% by weight of $NH_3$, 111 ml of doubly distilled water, 1.5 ml of an acid having a perfluoropolyether structure belonging to class (1) where $R_f$ is $CF_3$ and $R'_f$ is $CF_2COOH$ and an equivalent average molecular weight equal to 668, and 0.5 ml of an acid having a perfluoropolyether structure belonging to class (1) where $R_f$ is $CF_3$ and $R'_f$ is $CF_2COOH$ and an average molecular weight equal to 367, and 21.5 ml of t.butanol.

The composition by weight of the system was the following:

| | |
|---|---|
| aqueous phase | 66.7% |
| alcohol | 9.8% |
| fluorinated surfactants | 2.0% |
| rough perfluoropolyether | 21.5%. |

This microemulsion was applied by means of a brush or a compressed air sprayer in such manner as to cause a total amount of fluorinated components equal to about 20 g/m² to be deposited onto the test piece surface.

On the test pieces, the amount of absorbed water was measured after 4 days. Such amount was compared with the amount absorbed by four equivalent untreated test pieces, utilized as a check or control.

The measurement of water absorption was effected by causing to adhere to a face of the test pieces a rubber cylindrical gasket into which a measured amount of doubly distilled water was introduced. At pre-established time intervals the test piece surface was dried and the absorbed water amount was determined by weighing. The data obtained are reported hereinafter; the absorbed water is expressed in microliters/cm² of surface.

TABLE 1

| | Test piece 1 mean porosity brush application | | Test piece 2 mean porosity spray application | | Test piece 3 low porosity spray application | |
|---|---|---|---|---|---|---|
| Time | Treated | Untreated | Treated | Untreated | Treated | Untreated |
| 4 hours | 5.5 | 38.2 | 0 | 38.2 | 0 | 5.5 |
| 7 hours | 11.0 | 46.1 | 0 | 46.1 | 0 | 8.2 |

The amount of perfluoropolyether protective agent to be used varies as a function of the nature of the material to be treated, in particular its porosity. The total amount of perfluoropolyether ranges from 7 g/m² for low-porosity materials to be protected to 100 g/m² for materials exhibiting a higher porosity.

The results of this example prove that, for all the test pieces tested, the water absorption after the surface treatment with a microemulsion based on rough perfluoropolyethers is considerably reduced as compared with the corresponding untreated test pieces.

EXAMPLE 2

From an asbestos cement sheet, two test pieces measuring 15×24 cm were obtained. One of the two test pieces was left as such as a check, while onto the surface of the other test piece, by means of a compressed air sprayer, there was applied a microemulsion having the following composition:

11.8 g of a rough perfluoropolyether belonging to class (1) hydrolyzed by treatment with hot diluted $H_2SO_4$, having an average $CF_2COOH$ functionality equal to 0.6 and a viscosimetric average molecular weight of 4,000, containing peroxide bridges and consisting of a mixture of polymers having different molecular weights;

2.55 ml of a solution at 10% by weight of $NH_3$;
31.0 ml of doubly distilled water;
5.8 ml of isopropanol.

The composition by weight of the system was as follows:

| | |
|---|---|
| aqueous phase | 67.1% |
| alcohol | 9.3% |
| rough perfluoropolyether | 23.6%. |

The total fluorinated components amount deposited on the test piece was equal to about 7 g/m$^2$.

Water absorption measurements were carried out after three months by using a method analogous to the one described in the preceding example.

After 2 hours, the amount of water absorbed by the untreated test piece was of 41.3 mg/cm$^2$, while the amount of water absorbed by the treated test piece fell to 8.7 mg/cm$^2$.

EXAMPLE 3

Two Carrara marble test pieces were utilized having composition and porosity like those of the test piece described in Example 1 of Italian patent application No. 19,626 A/85. One of the two test pieces was superficially treated with a microemulsion having the following composition:

12.6 g of a rough perfluoropolyether belonging to class (1), having an average functionality due mainly to $CF_2COF$ equal to 0.46 and a viscosimetric average molecular weight equal to 4,600, containing peroxide bridges (P.O. =1.02) and consisting of a mixture of polymers having different molecular weights;

3.7 ml of a solution at 10% by weight of $NH_3$;
31 ml of doubly distilled water;
5.73 ml of t.butanol;
1.71 g of an acid having a perfluoropolyether structure belonging to class (1) where $R_f$ is $CF_3$ and $R'_f$ is $CF_2COOH$, an average molecular weight equal to 668, and the following by-weight composition:

| | |
|---|---|
| water phase | 63.40% |
| alcohol | 10.47% |
| fluorinated surfactants | 3.12% |
| rough perfluoropolyether | 23.10%. |

The microemulsion was applied by means of a brush. It was not possible to deposit the same amount (30 g/m$^2$) as indicated in Example 1 of the above-cited Italian patent application, because the test piece did not absorb an amount of microemulsion higher than 7.7 g of total fluorinated compounds/m$^2$.

The water absorption measurement was carried out in the same manner as is described in Example 1 of the present application. In the treated test piece, the absorbed water amount/cm$^2$ was equal to zero up to 30 minutes; in the untreated test piece the absorbed water amount measured after 30 minutes was, conversely, equal to 7.6 microliters/cm$^2$.

EXAMPLE 4 (COMPARATIVE TEST)

Two marble test pieces like those in Example 3 were utilized and having a mean porosity. One of the two test pieces was treated on the surface with a Freon solution at 50% by weight of a rough perfluoropolyether belonging to class (1), having an average functionality due mainly to $CF_2COF$ equal to 0.57 and a viscosimetric average molecular weight equal to 4,000, containing peroxide bridges (P.O. =1.02% by weight) and consisting of a mixture of polymers having different molecular weights. The application was carried out by means of a brush; the amount of fluorinated compound deposited on the test piece surface was of 7.9 g/m$^2$.

The other test piece was left as such, as a check.

Water absorption measurement was carried out according to the procedures described in Example 1 of the present application. In the treated example, the amount of water absorbed expressed in microliters/cm$^2$ was equal to 4.7 after 3 minutes, while in the untreated test piece the amount of water absorbed after the same time was 7.6.

From a comparison of the data of Examples 3 and 4, it is apparent that (the amount of fluorinated compounds present on the test piece surface being equal) the water absorption was equal to zero when the microemulsion was used (Example 3), while it was reduced by about 60%, referred to the test piece as such, when a Freon solution of the fluorinated compound was used.

EXAMPLE 5

Two Siena brick test pieces having a mean porosity of 40% were treated with a microemulsion having the following composition:

19.8 g of a perfluoropolyether containing —$CF_2COOH$ and —$CF_2COCF_3$ end groups belonging to class (1), containing —$CF_2COOH$ and —$CF_2COCF_3$ end groups having a viscosimetric average molecular weight equal to 2,080 and an equivalent average molecular weight equal to 2,860, consisting of a mixture of polymers having different molecular weights;

7 ml of a solution at 10% by weight of $NH_3$;
49.5 ml of doubly distilled water;
5.4 g of an acid having a perfluoropolyether structure belonging to class (1) where $R_f$ is $CF_3$ and $R'_f$ is $CF_2COOH$ and an average molecular weight equal to 668, and 8.1 g of an acid having a perfluoropolyether structure and an equivalent average molecular weight equal to 361, exhibiting the following composition by weight:

| | |
|---|---|
| aqueous phase | 64.12% |
| fluorinated surfactants | 14.55% |
| rough perfluoropolyether | 21.33%. |

The protective efficiency was measured by means of water absorption tests on the same test pieces before and after 2 and 25 days after the treatment. "Percent protective efficiency" means the ratio between the difference of water absorbed before and after the treatment and the amount of water absorbed by the untreated material, multiplied by one hundred. The amount of water absorbed by a test piece was measured in accordance with the method proposed by UNESCO-RILEM (International Symposium on Deterioration and Protection of Stone Instruments, Paris, 5-9 June 1978, Vol. 5, Test II.4). The data obtained are reported hereinafter:

| PFPE amount deposited on the test pieces (g/m$^2$) | Protective efficiency | |
|---|---|---|
| | after 2 days | after 25 days |
| 30 | 50% | 45% |
| 60 | 68% | 61% |
| 90 | 96% | 80% |

EXAMPLE 6

Utilized were two asbestos cement test pieces measuring 15×10 cm. One of these test pieces was kept as a check, while the other test piece was brush-treated with a microemulsion prepared by adding to 25.44 g of a rough perfluoropolyether belonging to class (1), hydrolyzed by treatment with hot diluted $H_2SO_4$, having an equivalent weight equal to 10,000 with respect to the acid groups ($CF_2COOH$) and a viscosimetric average molecular weight equal to 4,600, containing peroxide bridges (P.O. =1.02), and consisting of a mixture of polymers having different molecular weights, neutralized with 1.5 ml of an ammonia solution at 10% by weight of $NH_3$, 76.4 ml of triply distilled water, 14.4 g of isopropanol, 2.16 g of a carboxylic acid, and having an equivalent average weight equal to 668 and a perfluoropolyether structure belonging to class (1) where $R_f$ is $CF_3$ and $R'_f$ is $CF_2COOH$.

A system was a obtained characterized by a single limpid, transparent phase, which was indefinitely stable at a temperature from 20° to 80° C.

The composition by weight of the system was the following:

| rough perfluoropolyether | 21.2% |
|---|---|
| aqueous phase | 64.9% |
| fluorinated surfactant | 1.8% |
| alcohol | 12.1% |

The total amount of total fluorinated components deposited on the test piece was 6.4 g/m$^2$.

The obtained data are reported hereinbelow.

| Percent | Protective | Efficiency |
|---|---|---|
| 15 minutes | 1 hour | 10 days |
| 61.5% | unchanged | unchanged. |

EXAMPLE 7

A low-porosity marble test piece was kept as a check. The surface of a second like test piece was brush-treated with a protective agent consisting of a microemulsion prepared by adding to 25.44 g of a rough perfluoropolyether belonging to class (1), hydrolyzed by treatment with hot diluted $H_2SO_4$, having an average equivalent weight of 10,000 with respect to the acid groups ($CF_2COOH$) and a viscosimetric molecular weight equal to 4,600, containing peroxide bridges (P.O. =1.02), and composed of a mixture of polymers having different molecular weights, neutralized with 1.5 ml of an ammonia solution at 10% by weight of $NH_3$, 76.4 ml of doubly distilled water, 14.4 g of isopropanol, and 2.16 g of a carboxylic acid, and having an average equivalent weight equal to 668 and a perfluoropolyether structure belonging to class (1) where $R_f$ is $CF_3$ and $R'_f$ is $CF_2COOH$.

The resulting system was characterized by a single limpid, transparent phase, which was indefinitely stable at a temperature from 20° to 80° C.

The composition by weight of the system was as follows:

| rough perfluoropolyether | 21.2% |
|---|---|
| aqueous phase | 64.9% |
| fluorinated surfactant | 1.8% |
| alcohol | 12.1%. |

The amount of total fluorinated components deposited on the test piece was equal to 19.1 g/m$^2$.

The data obtained are reported hereinafter.

| Percent | Protective | Efficiency |
|---|---|---|
| 1 hour | | 7 hours |
| 72.2% | | unchanged. |

EXAMPLE 8

Two high-porosity marble test pieces were utilized. The first one was kept as a check, while the second one was treated with a microemulsion prepared by adding to 25.44 g of a rough perfluoropolyether belonging to class (1), hydrolyzed by treatment with hot diluted $H_2SO_4$, having an average equivalent weight of 10,000 with respect to the acid groups ($CF_2COOH$) and a viscosimetric molecular weight equal to 4,600, and containing peroxide bridges (P.O. =1.02), and consisting of a mixture of polymers having different molecular weights, neutralized with 1.5 ml of an ammonia solution at 10% by weight of $NH_3$, 76.5 ml of doubly distilled water, 14.4 g of isopropanol, and 2.16 g of a carboxylic acid, and having an average equivalent weight of 668 and a perfluoropolyether structure belonging to class (1) where $R_f$ is $CF_3$ and $R'_f$ is $CF_2COOH$.

The system obtained was characterized by a single limpid, transparent phase, which was indefinitely stable at a temperature from 20° to 80° C.

The composition by weight of the system was as follows:

| rough perfluoropolyether | 21.2% |
|---|---|
| aqueous phase | 64.9% |
| fluorinated surfactant | 1.8% |
| alcohol | 12.1%. |

The amount of total fluorinated components deposited on the test piece was equal to 20.2 g/m$^2$.

The percent protective efficiency measured after 1 hour exhibited a value of 88.4%. Such value was unchanged after 7 hours.

EXAMPLE 9

Four sandstone test pieces having a porosity of 8.5% and measuring 50×50×20 cm were used.

Test pieces 1 and 3 were not treated; test pieces 2 and 4 were treated by applying, by means of a brush, a microemulsion having the following composition:

1.55 g of a rough perfluoropolyether belonging to class (1), hydrolyzed by treatment with hot diluted $H_2SO_4$, and having an average equivalent molecular weight equal to 2,860 with respect to acid groups ($CF_2COOH$) and a viscosimetric molecular weight equal to 2,080, consisting of a mixture of polymers having different molecular weights;

0.5 ml of an ammonia solution at 10% by weight of $NH_3$;

9.48 g of doubly distilled water; and 2.2 g of isopropanol.

The resulting system was characterized by a single limpid, transparent phase, indefinitely stable at a temperature from 25° to 75° C. The composition by weight of the system was as follows:

| rough perfluoropolyether | 11.3% |
|---|---|
| aqueous phase | 72.7% |
| alcohol | 16.0%. |

The total amount of fluorinated components deposited on the test pieces was 30 g/m² for test piece 2 and 40 g/m² for test piece 4.

The treatment efficiency was evaluated on the basis of the amount of water absorbed by the various test pieces in 60 minutes and is expressed by the percent ratio of the difference between the amount of water absorbed by the untreated test piece and the amount of water absorbed by the test piece after it was treated, to the amount of water absorbed by the untreated test piece.

The test was carried out by applying to a face of the test pieces a device consisting of a glass cylinder filled with water and connected to a graduated micropipette which permitted measurement of the water amount absorbed by the contact surface of each test piece. The device is described in the document published by UNESCO-RILEM PEM No. 78,182.

The absorbed amount of water was read at preestablished intervals of time and the resulting value expressed in g/cm² of surface.

| Test piece | Absorbed water amount (g/cm²) | Percent protective efficiency |
|---|---|---|
| 1 | 0.010 | — |
| 2 | 0.0021 | 79.0 |
| 3 | 0.0140 | — |
| 4 | 0.0020 | 86.0 |

EXAMPLE 10

Four Siena brick test pieces having a porosity of 40% and measuring 50×50×52 cm were utilized. The first test piece was not treated; the other test pieces were brushtreated with a microemulsion having the following composition:

18.8 g of a rough perfluoropolyether hydrolyzed by treatment with hot diluted $H_2SO_4$, belonging to class (1), having an average equivalent molecular weight of 2,860 with respect to the acid groups ($CF_2COOH$) and a viscosimetric average molecular weight equal to 2,080, consisting of a mixture of polymers having different molecular weights;

10 ml of an ammonia solution at 10% by weight of $NH_3$;

49.5 ml of doubly distilled water;

5.4 g of a carboxylic acid having an average equivalent weight of 668 and 8.1 g of a carboxylic acid having an average equivalent weight of 361, each of them having a perfluoropolyether structure and belonging to class (1) where $R_f$ is $CF_3$ and $R'_f$ is $CF_2COOH$.

The resulting system consisted of a single limpid phase, which was stable at a temperature from 25° to 75° C, the percent composition by weight of which was as follows:

| rough perfluoropolyether | 21.3% |
|---|---|
| aqueous phase | 64.1% |
| fluorinated surfactants | 14.6%. |

The amount of total fluorinated components deposited on the test pieces was 30, 60, 90 g/m² for test pieces 2, 3 and 4, respectively.

The treatment efficiency was evaluated according to the method described above in Example 9.

| Test piece | Absorbed water amount (g/cm²) | Percent protective efficiency |
|---|---|---|
| 1 | 2.5 | — |
| 2 | 1.37 | 45.0 |
| 3 | 0.97 | 61.0 |
| 4 | 0.50 | 81.0 |

EXAMPLE 11

Six Vicenza stone test pieces (biocalcaselenite with a porosity of 30%) were used. Test pieces 1 and 4 were not treated; test pieces 2 and 3 were brush-treated with a microemulsion having the composition indicated above in Example 10; test pieces 5 and 6 were treated by applying by means of a brush a microemulsion having the following composition:

37.9 g of a rough perfluoropolyether belonging to class (1), hydrolyzed by treatment with hot diluted $H_2SO_4$, having an average equivalent molecular weight of 10,000 with respect to the acid groups ($CF_2COOH$) and a viscosimetric average molecular weight equal to 4,600, containing peroxide bridges (P.O. = 1.02) and consisting of a mixture of polymers having different molecular weights;

6.5 ml of an ammonia solution at 10% by weight of $NH_3$;

111 ml of doubly distilled water;

17.2 g of ter.butanol;

0.9 g of a carboxylic acid having an average equivalent weight of 361 and 2.7 g of a carboxylic acid having an average equivalent weight of 668, each of them having a perfluoropolyether structure and belonging to class (1) where $R_f$ is $CF_3$ and $R'_f$ is $CF_2COOH$.

The resulting system was characterized by a single limpid phase, stable at a temperature from 25° to 75° C. and having the following percent composition by weight:

| rough perfluoropolyether | 21.5% |
|---|---|
| aqueous phase | 66.7% |
| alcohol | 9.8% |
| fluorinated surfactants | 2.0%. |

The total amount of fluorinated components deposited on the test pieces was 90 g/m² for test pieces 2 and 5 and 120 g/m² for test pieces 3 and 6. The treatment efficiency was evaluated according to the procedures described in Example 9.

| Test piece | Absorbed water amount (g/cm²) | Percent protective efficiency |
|---|---|---|
| 1 | 0.940 | — |
| 2 | 0.297 | 68.0% |
| 3 | 0.141 | 85.0% |
| 4 | 1.200 | — |
| 5 | 0.750 | 38.0% |
| 6 | 0.220 | 65.0% |

EXAMPLE 12

Four cement A test pieces (porosity: 18%) and two cement B test pieces (porosity: 25%) were utilized. A test piece of each type of cement was left as such as a check; the other test pieces were brush-treated with the microemulsion having the composition indicated above in Example 10.

For cement A, the total amount of fluorinated components deposited on test pieces 2, 3 and 4 was 36, 45 and 60 g/m² respectively For cement B, the total amount of fluorinated components deposited on test piece 2 was 43 g/m².

The treatment efficiency was evaluated according to the procedures described above in Example 9. The results are shown below:

| Test piece | Absorbed water amount (g/cm²) | Percent protective efficiency |
|---|---|---|
| Cement A | | |
| 1 | 0.32–0.38 | — |
| 2 | 0.154 | 57.0% |
| 3 | 0.140 | 60.0% |
| 4 | 0.047 | 87.0% |
| Cement B | | |
| 1 | 0.36–0.44 | — |
| 2 | 0.114 | 70.0% |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A process for protecting marble, stone, tiles, cement, gypsum, or wood and other analogous materials utilized in particular in the building industry from the deteriorating action of atmospheric agents and pollutants, by applying onto said materials a protective agent comprising a microemulsion of perfluoropolyethers containing functionalized groups and, optionally, peroxide bridges in the chain.

2. A process for protecting marble, stone, tiles, cement, gypsum, or wood and other similar materials utilized in particular in the building industry from the deteriorating action caused by atmospheric agents and pollutants, by applying onto said materials a protective agent selected from products having a perfluoropolyether structure, consisting of sequences of fluoro-oxyalkylene units selected from the class consisting of:

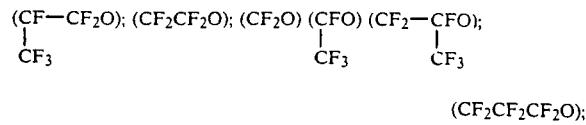

$(CF_2CF_2CF_2O);$ and $(CF_2CF_2CH_2O)$, and at least one functional end group, optionally also in the chain, said functional groups being represented by the formula:

$CFX\!-\!(B)_J\!-\!Z_K$ where X is F or $CF_3$ and where J = 0 or 1, B is a divalent or polyvalent linking hydrocarbon radical, in particular an alkylene or a cycloalkylene or an arylene radical, having up to 20 carbon atoms, K varies from 1 to 3 and Z is a group capable of forming a chemical and/or physical bond with the above material and selected from:

a non-aromatic, non-fluorinated organic radical containing heteroatoms which are electron doublet donors, or an aromatic radical whether or not containing heteroatoms, capable of giving rise to coordinate bonds or to charge transfer bonds, thus causing various kinds of adsorption phenomena on the substrate;

—$CONR^2R^3$, —COOR, where R is H or an alkyl group containing from 1 to 8 carbon atoms, an aromatic or an alkyl-aromatic group such as benzyl;

—OH, —COF;

—NCO, —NHR, —COR; —CO—$CF_3$; —C(OH)$_2$—$CF_3$;

$SO_3H$;

polyoxyalkylene—OH; and quaternary ammonium;

and characterized furthermore in that the perfluoropolyether product is applied in the form of an aqueous microemulsion.

3. The process of claim 2, wherein the perfluoropolyethers utilized for preparing the microemulsion are obtained by photo-oxidation of $C_2F_4$ and/or $C_3F_6$.

4. The process of claim 3, wherein the perfluoropolyethers utilized for preparing the microemulsion are obtained through an oxidation process in the liquid phase with molecular oxygen in the presence of ultraviolet rays, of a mixture of $C_2F_4$ and/or $C_3F_6$ and a perfluorinated conjugated diene at a temperature ranging from −80° to 50° C., and subsequent heat treatment.

5. The process of claim 4, wherein the perfluoropolyethers utilized for preparing the microemulsions have one of the following formulas:

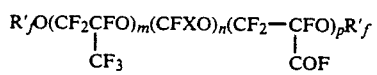

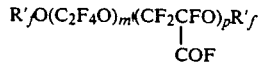

where m, n and p are integers different from zero, and $R_f$ and $R'_f$ may be COF groups or perfluoroalkyl groups having from 1 to 3 carbon atoms.

6. The process of claim 2, wherein the perfluorooxyalkylene units belong to one of the following classes:

(1) 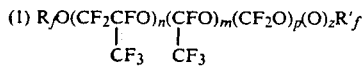

with a random distribution of the perfluorooxyalkylene units, where m, n, p and z have such mean values as to meet the abovesaid requirements concerning the mean molecular weight; and z is zero or an integer; where $R_f$ and $R'_f$, either alike or different from each other, may be perfluoroalkyl end groups optionally containing 1 to 3 carbon atoms and at least one of said end groups is a functional groups of type $CFX-(B)_J-Z_K$, where B, J, Z, X and K are the same as defined hereinbefore;

(2) $R_fO(CF_2CF_2O)_n(CF_2O)_m(O)_zR'_f$ with a random distribution of the perfluorooxyalkylene units, where m, n and z have such values as to meet the above requirements; where $R_f$ and $R'_f$ may be perfluoroalkylene end groups having 1 to 3 carbon atoms and at least one of said end groups is a functional group of the type $(B)_J, Z_K$, and where B, J, Z, K are the same as defined above;

(3) 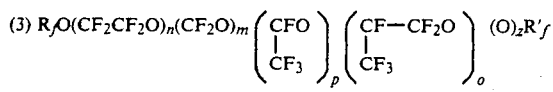

where m, n, p, o and z have such mean values as to meet the abovesaid requirements and $R_f$ and $R'_f$ are the same as defined hereinbefore;

(4) 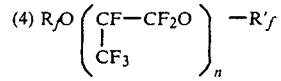

where n has such an average value as to meet the abovesaid requirements, and $R_f$ and $R'_f$ are the same as defined hereinbefore;

(5) $R_fO(CF_2CF_2O)_nR'_f$, where n has such an average value as to meet the abovesaid requirements, and $R_f$ and $R'_f$ are the same as defined hereinbefore;

(6) $R_fO(CF_2CF_2CF_2O)_nR'_f$ or $R_fO(CH_2CF_2CF_2O)_nR'_f$, where n has such an average value as to meet the abovesaid requirements and $R_f$ and $R'_f$ are the same as defined hereinbefore.

7. The process of claim 2, wherein the functional perfluoropolyethers have a molecular weight ranging from 1,000 to 10,000.

8. The process of claim 2, wherein the functional perfluoropolyethers have a molecular weight ranging from 2,000 to 6,000.

9. The process of claim 2, wherein said microemulsions are of the oil-in-water type or of the water-in-oil type.

10. The process of claim 2, wherein K is equal to 1 and B has up to 8 carbon atoms.

11. The process of claim 2, wherein Z is selected from COOH, OH, polyoxyalkylene—OH, and quaternary ammonium groups, $-CO-CF_3$ and $-C(OH)_2-CF_3$.

12. The process of claim 11, wherein the acid end group is salified.

* * * * *